Figure 1:
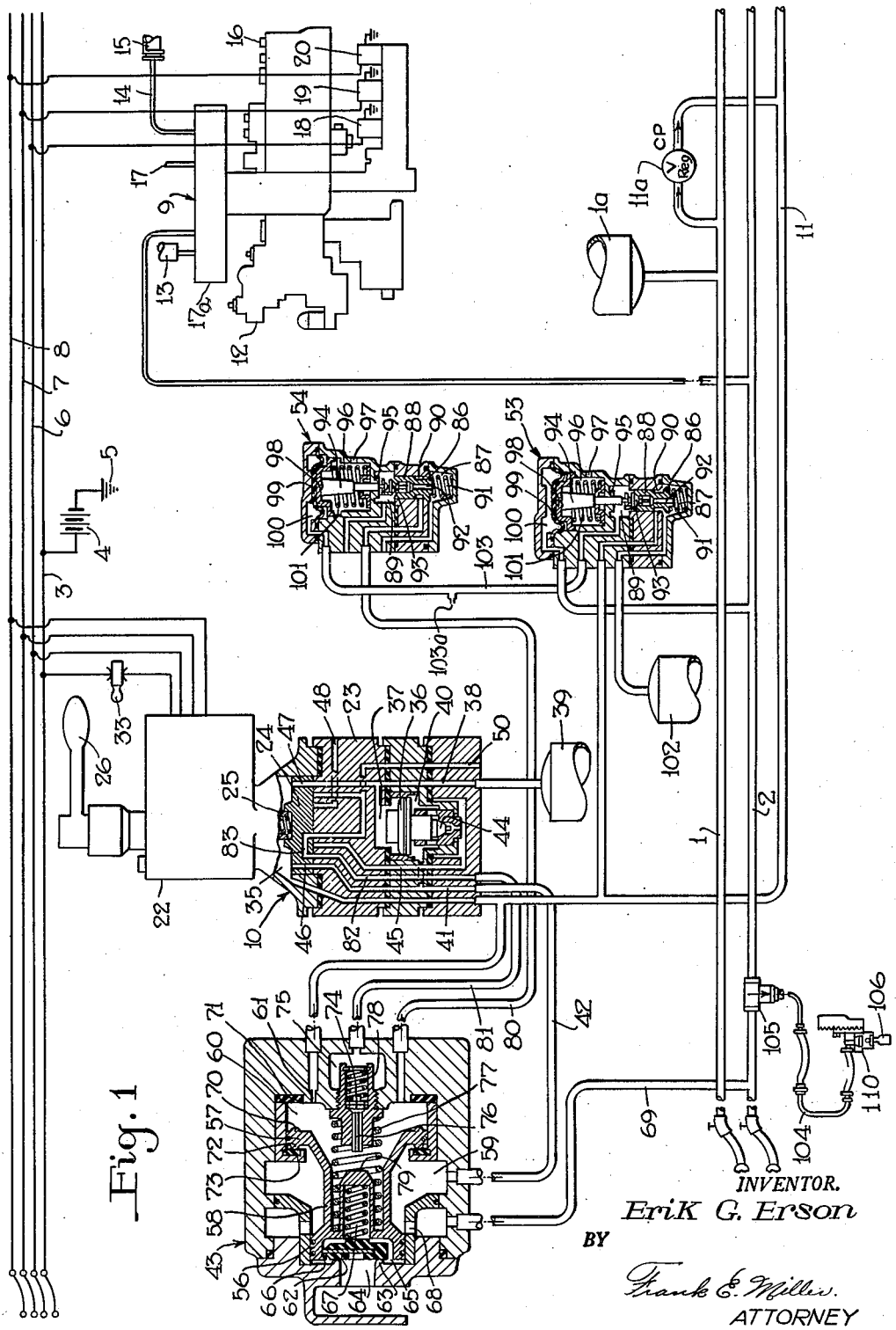

Dec. 25, 1951  E. G. ERSON  2,580,348
FLUID PRESSURE BRAKE APPARATUS
Filed Feb. 23, 1950  2 SHEETS—SHEET 2

INVENTOR.
Erik G. Erson
BY
Frank E. Miller
ATTORNEY

Patented Dec. 25, 1951

2,580,348

UNITED STATES PATENT OFFICE 2,580,348

FLUID PRESSURE BRAKE APPARATUS

Erik G. Erson, Wilkinsburg, Pa., assignor to Westinghouse Air Brake Company, a corporation of Pennsylvania Application February 23, 1950, Serial No. 145,754

5 Claims. (Cl. 303—18)

This invention relates to fluid pressure brake equipment and more particularly to the electropneumatic type for use in connection with braking vehicles adapted to be controlled from either end and to be operated individually or in trains, such as subway cars or the like.

Certain vehicles in the above type of service have for years been equipped with Westinghouse Air Brake Company's "AMUE" electro-pneumatic brake equipment fully disclosed in their instruction pamphlet No. T-5051-13 dated February 1938. This equipment comprises two trip valve devices located at opposite sides of the vehicle, one on each truck, in such a manner that when a road bed trip is set against train movement, said trip will engage a normally depending handle of one of the trip valve devices and operate said device to an open position for effecting an emergency reduction in pressure in the usual brake pipe to thereby cause an emergency application of brakes on the vehicle or train, as the case may be, to promptly bring it to a stop. A trip valve device application of brakes usually occurs, as just described, when the operator's brake valve device is in release position supplying fluid under pressure to the brake pipe. It is undesirable to thus continue supply of fluid under pressure to the brake pipe which is open to atmosphere through the operated trip valve device, so it is customary to promptly move the brake valve device to lap position to cut off the supply of fluid under pressure to the brake pipe when such an application of brakes occurs. Before the car or train is again operated, the operator must leave his control station and go down along the road bed to the trip valve device which had operated to cause the emergency application of brakes and move the handle thereof back to its normally depending position to close the vent from the brake pipe, following which, he will return to his control station in the vehicle or train and move his brake valve device to release position to recharge the brake pipe and brake system for releasing the brakes on the vehicle or train after which he may proceed.

Recently new cars placed in the above type of service have been equipped with what is known as the "SMEE" brake equipment which is substantially like that disclosed in the pending application of Samuel L. Williams et al., Serial No. 47,046, filed August 31, 1948. This brake equipment, in contrast to the "AMUE" brake equipment, embodies an automatically closing or resetting trip valve device, that is, a trip valve device which after operation by a road bed trip to vent the brake pipe for effecting an emergency application of brakes, automatically closes the vent from the brake pipe to eliminate the need for the operator to leave his control station for resetting the trip valve device, as required with the "AMUE" brake equipment, to release the application of brakes. Further, with the "SMEE" brake equipment the operator's brake valve device when in release position does not establish a brake pipe charging communication like the brake valve device in the "AMUE" brake equipment so that it is not necessary, when a trip valve emergency application of brakes is effected, to move the brake valve device out of release position to avoid undesired waste of fluid under pressure. In order to release a trip valve emergency application of brakes with the "SMEE" brake equipment it is however necessary to move the brake valve device to a full service position for recharging the brake pipe and certain other parts of the equipment to a certain pressure while retaining the brakes fully applied, after which the brake valve device will be returned to release position to release the brakes.

It is now desired to use the automatic closing type of trip valve device employed with the "SMEE" brake equipment on vehicles equipped with the old "AMUE" brake equipment in place of the manually resettable type which has been used to date but the mere substitution of one for the other will not be satisfactory since, on account of the brake valve device of the "AMUE" brake equipment establishing a brake pipe charging communication in its release position, an emergency application of brakes initiated by operation of the automatic closing type of trip valve device could be promptly released unless the operator promptly moved the brake valve device out of its release position which can not be depended upon since the operator might be incapacitated.

The principal object of the invention is therefore to so modify the "AMUE" brake equipment as to permit use of an automatic closing type of trip valve device therewith.

Other objects and advantages will become apparent from the following more detailed description of the invention.

Figure 3:
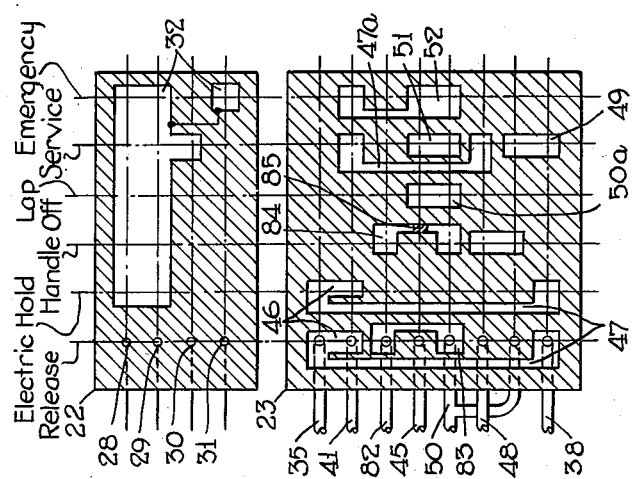
Figure 2:
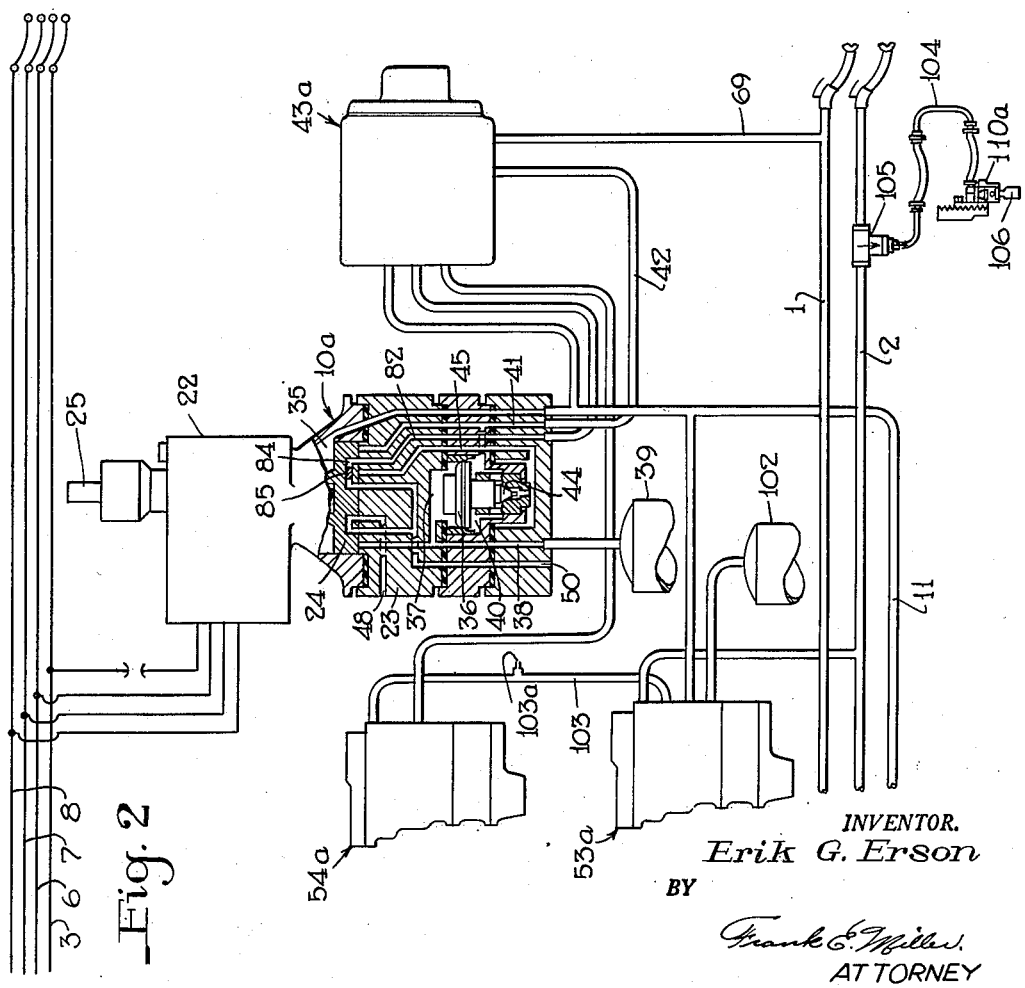

In the accompanying drawings: Figs. 1 and 2, when the right-hand edge of Fig. 1 is matched to the left-hand edge of Fig. 2, is a diagrammatic view, partly in section and partly in outline, of an electro-pneumatic brake equipment embodying the invention; and Fig. 3 is a diagrammatic, development view of switch and valve portions of operator's brake valve devices shown in Figs. 1 and 2.

Description

As shown in the drawing, 1 is a fluid pressure supply pipe adapted to be constantly supplied with fluid under pressure from any suitable source, such as a reservoir 1a; 2 is a brake pipe; 3 is an electric supply wire connected to one terminal of an electric supply such as a battery 4, the other terminal of which is grounded at 5; 6 is a brake release wire; 7 is a service application wire; and 8 is an emergency application wire, all of said pipes and wires extending to opposite ends of a vehicle for connection with corresponding parts on another vehicle in the case of a train. 9 is a brake controlling valve device and 10 and 10a are two identical operator's brake valve devices adapted to be located at opposite ends of the vehicle. 11 is a feed valve pipe connected to brake valve devices 10, 10a and adapted to be constantly supplied with fluid from the supply pipe 1 at a suitable reduced pressure through a constant pressure outlet or reducing valve device 11a. The parts so far enumerated are identical in structure and operation and are connected in the same manner as corresponding parts in the "AMUE" brake equipment disclosed in the above referred to instruction pamphlet and since reference may be made to said pamphlet for a detailed description of this equipment, only a brief description of these parts as necessary for an understanding of the invention will now be given herein.

The brake controlling valve device 9 comprises a service application valve device 12 adapted to respond to a service reduction in pressure in the brake pipe 2 to supply fluid from a precharged auxiliary reservoir 13, at a pressure corresponding to the degree of such reduction, to a pipe 14 which, for illustration, may be connected directly to a brake cylinder device 15 whereby such pressure may operate said brake cylinder device to effect an application of brakes. The brake controlling valve device 9 further comprises an emergency application valve device 16 arranged to operate upon an emergency reduction in pressure in brake pipe 2 to supply fluid from a source, such as a pipe 17, to the brake cylinder device 15 for effecting an emergency application of brakes. Upon restoration of pressure in brake pipe 2 the service application valve device 12 and emergency application valve device 16 are adapted to operate to their normal position for releasing fluid under pressure from the brake cylinder device 15 and for recharging auxiliary reservoir 13 with fluid under pressure from the brake pipe.

The service application valve device 12 and emergency application valve device 16 are mounted on opposite sides of a pipe bracket 17a with which there is associated a magnet valve portion comprising a release magnet 18, a service application magnet 19 and an emergency application magnet 20, said magnet valve devices being connected to the release, service and emergency wires 6, 7 and 8 respectively. Upon supply of electric current from battery 4 to the release wire 6 and service wire 7 the release magnet 18 and service magnet 19 are adapted to be energized to, respectively, close a vent from the brake cylinder device 15 and to supply fluid under pressure to said brake cylinder device for effecting a service application of brakes on the vehicle. Upon energization of the release wire 6 and emergency wire 8 by current from battery 4 the release magnet 18 and emergency magnet 20 are adapted to be energized for, respectively, closing a vent from the brake cylinder device the same as in effecting a service application of brakes, and for also supplying fluid under pressure to the brake cylinder device 15 for effecting an emergency application of brakes. Supply of electric current from battery 4 only to the release wire 6 subsequent to effecting a service application of brakes will maintain the vent from the brake cylinder device 15 closed to thereby hold an application of brakes in effect.

The brake valve devices 10 and 10a each comprises an electric switch portion 22 and a valve portion 23 including a rotary valve 24, said switch portion and rotary valve being arranged for operation in unison by a common shaft 25 adapted to be turned by an operator's removable handle 26. Only one handle 26 is provided on a vehicle and is applied to the brake valve device at the selected control end of the vehicle, as shown in the drawing.

The brake valve handle 26, and thereby the electric portion 22 and rotary valve 24 in each brake valve device has spaced apart, release, electric holding, handle off, lap, service and emergency positions, as designated in Fig. 3 by legends. The brake valve handle 26 is shown in Fig. 1 in its release position and in Fig. 2 in its handle off position.

The electric portion 22 of each brake valve device 10 and 10a comprises four spaced apart fixed contacts 28, 29, 30 and 31 and a movable contact 32 (Fig. 3) arranged to cooperate with said fixed contacts according to different positions of the brake valve handle 26, as will be presently described. The fixed contact 28 is adapted to be connected to the current supply wire 3 by a removable plug switch 33 only one of which is provided on the vehicle and adapted to be used at the end of the vehicle from which it is desired to control the vehicle brakes. At the opposite or non-control end of the vehicle the fixed contact 28 in the brake valve device will not therefore be connected to the current supply wire 3. The contacts 29, 30 and 31 at both brake valve devices 10 and 10a are connected respectively to the release wire 6, the service application wire 7 and the emergency application wire 8.

In each brake valve device 10, 10a the rotary valve 24 is contained in a chamber 35 which is constantly supplied with fluid under pressure from the feed valve pipe 11. Each brake valve device further comprises an equalizing discharge valve device embodying a piston 36 subject on one side to pressure of fluid in a chamber 37 which is connected to a passage 38 leading in one direction to the seat of rotary valve 24 and in the opposite direction to an equalizing reservoir 39. At the opposite side of piston 36 is a chamber 40 connected to a passage 41 leading to the seat of rotary valve 24 and also connected to a pipe 42 adapted to be normally open to brake pipe 2 through a brake application valve device 43 at the brake valve device 10 or 43a at the brake valve device 10a. The valve devices 43, 43a constitute a part of the invention and will be described subsequently. Carried by piston 36 is a brake pipe discharge valve 44 arranged to control communication between chamber 40, and thereby the brake pipe 2, and an exhaust passage 45 leading to the seat of the rotary valve 24.

Assuming that the brake valve device 10a is at the non-control end of the vehicle and in handle off position and that the plug switch 33 is applied only at the opposite or control end, it will be noted that the current supply via wire 3 to said brake valve device is cut off and the release contact 29, service contact 30 and emergency contact 31 are disconnected from each other, while at the rotary valve 24, passage 41 from the brake pipe 2, passage 45 from the brake pipe discharge valve 44 and passage 38 from the equalizing reservoir 39 are all lapped by said rotary valve, so as to provide for control of brakes only by the brake valve device 10 at the opposite or selected control end of the vehicle.

With the brake valve device 10 at the selected control end of the vehicle in release position, in which it is shown in Fig. 1, a port 46 through the rotary valve opens chamber 35 to the brake pipe passage 41, and assuming that said chamber is charged with fluid under pressure from the feed valve pipe 1, such fluid will flow through said port to said passage and thence through the brake application valve device 43 to the brake pipe 2 to charge same and to thereby actuate the service application valve device 12 and emergency application valve device 16 of the brake controlling valve device 9 to their normal or brake release positions. Chamber 40 below the equalizing piston 36 being connected to the brake pipe passage 41 will also become charged with fluid at the same pressure as the brake pipe 2.

Fluid under pressure from the rotary valve chamber 35 in brake valve device 10 will also flow through a port 47 in rotary valve 24 to passage 38 and thence to the equalizing reservoir 39 and equalizing piston chamber 37 to charge said reservoir and chamber with fluid at the same pressure as in the brake pipe. With the equalizing piston 36 thus subject on opposite sides to the same pressures of fluid, said piston will hold the discharge valve 44 seated.

Also in release position of the brake valve device 10 no electrical circuits are established in the electric portion 22 whereby the release magnet 18 will be deenergized for venting the brake cylinder device 15.

Now let it be assumed that the handle 26 of the brake valve device 10 is turned to service position. The release magnet 18 will thereby be energized to close the brake cylinder release vent and the service application magnet 19 will also be energized to effect an electro-pneumatic service application of brakes. The rotary valve 24 will also be in service position in which the brake pipe passage 41 and equalizing piston chamber 40 are disconnected from the fluid pressure supply in rotary valve chamber 35 and connected by way of a cavity 47a to an exhaust passage 48, and at the same time a cavity 49 in the rotary valve will connect equalizing reservoir passage 38 to an exhaust passage 50 to which the discharge valve passage 45 will also be open via a cavity 51 in the rotary valve. The consequent venting of fluid under pressure from the equalizing reservoir 39 and piston chamber 37 will reduce such pressure below the brake pipe pressure in chamber 40, as a result of which, the equalizing piston 36 will move up to unseat the discharge valve 44 whereupon fluid under pressure will also be vented from the brake pipe 2 past said valve to passage 45 and thence through cavity 51 in the rotary valve and exhaust passage 50 to atmosphere. It will be noted that fluid under pressure is vented from the brake pipe 2 via cavity 47a in the rotary valve as well as past the discharge valve 44, the vent via cavity 47a initiating the reduction in brake pipe pressure sooner than would be the case past said discharge valve, but due to the relatively large volume of the brake pipe 2 on a vehicle as compared to that of the equalizing reservoir 39, the reduction in pressure in said reservoir and equalizing piston chamber 37 will overtake and then lead the reduction in brake pipe pressure upon opening of the discharge valve 44 to permit the reduction in pressure in said reservoir to control the degree of reduction in pressure in the brake pipe 2, as will be later brought out.

If the service magnet 19 becomes energized and effects an application of brakes as intended upon movement of the brake valve handle 26 to service position, the reduction in pressure in brake pipe 2 effected as just described will be to no avail, but in case such an application of brakes fails to materialize, then the service portion 12 of the brake controlling valve device 9 will operate in response to the reduction in pressure in brake pipe 2 to effect an application of brakes.

When a desired degree of service brake application is obtained the brake valve handle 26 will be moved to lap position to effect deenergization of the service application magnet 19 while holding the release magnet 18 energized. The supply of fluid to the brake cylinder device 15 will thereby be cut off while the release magnet remaining energized will hold the pressure in said brake cylinder device to maintain the brakes applied.

Also in lap position of handle 26 the brake pipe 2 will be disconnected from the exhaust passage 48, the equalizing reservoir 39 will be disconnected from the exhaust passage 50 but the brake pipe discharge valve passage 45 will remain open to the exhaust passage 50 via cavity 50a. The reduction in pressure in the equalizing reservoir 39 and piston chamber 37 will thereby be terminated, but brake pipe pressure acting on the opposite side of the equalizing piston 36 will hold the discharge valve 44 open and permit fluid under pressure to continue to release from the brake pipe 2 until the pressure therein becomes reduced to substantially that still effective in equalizing piston chamber 37 whereupon the piston 36 will be operated to seat the discharge valve 44. If the application of brakes is due to the reduction in pressure thus affected in the brake pipe, the degree of such application will be correspondingly limited by operation of the service application valve device 12 in the well-known manner.

If it is desired to effect an increased application of brakes, the brake valve handle 26 may be moved from lap position again to service position to increase the application to the desired degree, and then be moved back to lap position, as will be clear from the above description.

If due to energization of the release magnet 18 and service magnet 19 the brakes on the vehicle are applied and it is desired to restore the pressure in brake pipe 2 back to normal while holding the brakes thus applied, the brake valve handle 26 will be moved to holding position in which the release magnet 18 will remain energized to hold the brakes applied, and in which via ports 46 and 47 in the rotary valve 24 the brake pipe 2 and equalizing reservoir 39 and thereby chambers 37 and 40 at opposite sides of the equalizing piston 36 will be recharged with fluid to the pressure normally carried in the brake pipe. It will be apparent that if the application of brakes were due to the previous reduction in pressure in brake pipe 2, the recharging the brake pipe in holding position would release such application, that is, the holding position is only for the purpose above described and is of no account when the application is due to a reduction in pressure in brake pipe 2.

In order to release an application of brakes, the brake valve handle 26 will be returned to release position for deenergizing the release magnet 18 and for recharging the brake pipe 2 in the same manner as in holding position, if not already so charged, whereupon the release of brakes will occur due either to operation of said magnet or the increase in pressure in the brake pipe, as the case may be.

If it is desired to effect an emergency application of brakes the brake valve handle 26 will be moved to emergency position for energizing the release magnet 18 and emergency magnet 20 and for at the same time opening the brake pipe passage 41 to the exhaust passage 50 via cavity 52 in the rotary valve whereby in either case an emergency reduction in brake pipe pressure will occur to cause operation of the emergency portion 16 of the brake controlling valve device 9 to effect an emergency application of brakes on the vehicle.

In order to release the brakes after an emergency application the brake valve handle 26 may be returned to release position, or first to holding position, if desired, whereupon the release will occur in the same manner as above described.

According to the invention I provide at opposite ends of the vehicle, adjacent the brake valve devices 10, 10a, in addition to the brake application valve devices 43, 43a, pilot valve devices 53, 53a and relay valve devices 54, 54a, respectively.

The brake application valve devices 43, 43a are identical, each comprising two, spaced apart and coaxially arranged pistons 56, 57 connected together by a stem 58. The two pistons 56, 57 cooperate to form between them a chamber 59 open to the respective pipe 42; while at the opposite side of piston 57 there is a chamber 60 open to the feed valve pipe 11 through a restriction or choke 61 whereby there is adapted to be a constant reduced flow of fluid under pressure to chamber 60 from said pipe. Disposed in a cavity in the outer face of piston 56 is a valve 62 arranged to cooperate with an annular seat rib 63 in the casing to control communication between an atmospheric passage 64 encircled by said rib and an annular cavity 65 encircling said rib. A shoulder 66 projecting from piston 56 is arranged to contact valve 62 to pull same from its seat on rib 63 upon movement of said piston away from said seat. A spring 67 resiliently urges the valve 62 toward shoulder 66.

With the valve 62 engaging seat rib 63 the piston 56 is adapted to open to chamber 59 a plurality of ports 68 which are connected by a pipe 69 to the brake pipe 2. The pistons 56, 57 are adapted to move from their normal position, in which they are shown in the drawing, to a brake pipe venting position defined by sealing engagement of a rib 70 in the outer face of piston 57 with a gasket 71. In this venting position the valve 62 is adapted to be unseated and the piston 56 disposed at the side of ports 68 opposite that in which it is shown in the drawing to thereby close communication between chamber 59 and the pipe 69 and to open said pipe to the atmospheric passage 64. In the normal position of piston 57 an annular rib 72 on its inner face is adapted to seal against a gasket 73, the sealing of the ribs 70 and 72 with the respective gaskets 71 and 73 being adapted to prevent leakage of fluid under pressure from chamber 70 to chamber 59 in the different positions of piston 57. A spring 77 contained in chamber 60 acts on the piston 56 for urging said piston and the piston 57 to their normal position.

Each brake application valve device 43, 43a further comprises a lock valve 74 contained in a chamber 75 for controlling communication between said chamber and chamber 60 through a bore in which is slidably mounted a fluted stem 76 of said valve. A spring 78 acts on the valve for urging it to contact with its seat. The valve 74 and its stem 76 are arranged in coaxial relation to the piston 57, and said stem extends into chamber 60 for engagement by a projection 79 from piston 56 to unseat said valve upon movement of the pistons 56, 57 to open the valve 62. With the valve 62 seated the projection 79 is adapted to be spaced from valve 74 to ensure seating of the latter valve by spring 78.

In each brake application valve device 43, 43a the chamber 60 is connected by a pipe 80 to the respective relay valve device 54, 54a, while the lock valve chamber 75 is connected by a pipe 81 to a passage 82 in the respective brake valve device 10, 10a.

The passage 82 in each brake valve device 10, 10a constitutes a passage already present but not now used in the brake valve devices of the "AMUE" brake equipment and the rotary valve 24 of said brake valve device is also provided with passages 83, 84 for connecting passage 82 to the exhaust passage 50 in, respectively, the release and handle off positions, of said rotary valve, said rotary valve lapping passage 82 in all other positions of said rotary valve. According to the invention, at each end of the vehicle, the pipe 81 is connected to the already present passage 82 in the brake valve device 10 or 10a as just mentioned and communication is closed through the rotary valve passage 84 as by a plug 85.

The pilot valve devices 53, 53a and relay valve devices 54, 54a are all identical, each comprising a valve 86 contained in a chamber 87 and formed on one end of a plunger 88 which is slidably mounted in the casing of the device with the opposite end of said plunger open to a chamber 89. The plunger 88 is provided adjacent the valve 86 with an annular cavity 90, said valve controlling communication between said cavity and chamber 87. A spring 91 in chamber 87 acts on valve 86 for urging it to closed position. A bore 92 extending axially through valve 86 and plunger 88 is open at one end to chamber 87 and opens at its opposite end through a valve seat to chamber 89, a valve 93 being provided in the latter chamber for cooperation with said seat to control communication between chambers 87 and 89. The valve 93 is connected to one end of a stem 94 extending through a bore in a partition wall 95 into a chamber 96 which is vented through a port 97. The opposite end of stem 94 is provided in chamber 96 with a head 98 engaging one side of a flexible diaphragm 99 at the opposite side of which is a pressure chamber 100. A spring 101 contained in chamber 96 acts through the head 98 on diaphragm 99 with a chosen degree of force.

At each of the pilot valve devices 53, 53a the diaphragm chamber 100 is connected to the brake pipe 2 at that end of the vehicle, the valve chamber 87 is connected to a timing reservoir 102 and the annular cavity 90 is connected to the feed valve pipe 11 and hence is adapted to be constantly supplied with fluid under pressure, while the valve chamber 89 is connected by a pipe 103 to diaphragm chamber 100 in the respective relay valve device 54, 54a. Valve chambers 87 and 89 in each relay valve device 54, 54a are open to atmosphere, while the annular cavity 90 in each is open to pipe 80 at that end of the vehicle and thereby to chamber 60 in the respective brake application valve device 43 or 43a. The pipe 103 at each end of the vehicle is open directly to atmosphere through a restricted passage or leak port 103a.

According to the invention, I further provide at opposite ends of the vehicle automatic closing trip valve devices 110, 110a, respectively, each of which is connected to the brake pipe 2 through a conduit 104 and a T connection 105 containing a check valve (not shown) arranged to permit flow of fluid under pressure in the direction from brake pipe 2 to said trip valve device but to prevent flow in the opposite direction. The trip valve devices 110, 110a and T connection 105 are identical to those employed in the "SMEE" brake equipment heretofore referred to, each trip valve device comprising a normally depending arm 106 adapted upon engagement with a road bed trip (not shown) to be swung out of its depending position to open the brake pipe 2 to atmosphere and which is adapted to automatically return to its depending position and close communication between brake pipe and atmosphere when pressure of fluid in the brake pipe is reduced to a chosen low degree.

In operation, let it be assumed that the handle 26 of the controlling brake valve device 10 is in release position, that the other brake valve device 10a is in handle off position and that the brake pipe 2 is charged with fluid under pressure (in a manner which will be later described) and that the brakes on the vehicle are released. With the brake pipe charged with fluid under pressure said pressure acting in chamber 100 of the pilot valve devices 53, 53a will act in each to deflect diaphragm 99 against spring 101 for closing valve 93 and opening valve 86 whereby the connected reservoir 102 will become charged with fluid under pressure from the feed valve pipe 11.

With the valve 93 closed in each pilot valve device 53, 53a diaphragm chamber 100 in the connected relay valve device 54, 54a will be vented through the leak port 103a in the connecting pipe 103, whereby spring 101 in each relay valve device will deflect the diaphragm 99 to the position in which it is shown in the drawing for opening the respective valve 93 and closing the respective valve 86. At each relay valve device the annular cavity 90 and thereby the connected pipe 80 will be disconnected from chamber 87, whereby at each brake application valve device 43, 43a the supply of fluid under pressure from the feed valve pipe 11 through choke 61 to chamber 60 will be enabled to build up a pressure therein equal to that supplied by the controlling brake valve device to chamber 59 and permit movement of the pistons 56, 57 to their normal positions by spring 77 for thereby opening communication between the brake pipe 2 and said chamber.

With chamber 59 in the brake application valve device 43 or 43a at the control end of the vehicle thus open to brake pipe 2, the brakes on the vehicle may be controlled by operation of the respective brake valve device 10 or 10a in the same manner as before described.

With the brakes on the vehicle released, under control of the brake valve device 10 and the vehicle in motion, let it be assumed that the arm 106 of trip valve device 110 is struck by a track trip and swung out of its normal depending position to effect an emergency reduction in pressure in the brake pipe 2. As soon as the pressure in the brake pipe 2 is thus reduced to a degree slightly lower than that which would exist in said brake pipe at the end of a full service reduction, said reduced pressure in chamber 100 of each pilot valve device 53, 53a will permit spring 101 therein to deflect said diaphragm and open valve 93 and permit closing of valve 86 by spring 91. At each pilot valve device 53, 53a the connected reservoir 102 charged with fluid under pressure will thereby be connected past the open valve 93 to the connected pipe 103 and thereby diaphragm chamber 100 in the relay valve device 54 or 54a at that end of the vehicle. In each relay valve device 54, 54a the diaphragm 99 will be deflected by this pressure in diaphragm chamber 100 to close valve 93 and open valve 86 for thereby venting via the connected pipe 80 the fluid under pressure present in chamber 60 of the respective brake application valve device 43, 43a. At each brake application valve device this venting of fluid under pressure from chamber 60 so exceeds the rate of supply of fluid under pressure to said chamber from the feed valve pipe 11 via choked communication 61 as to reduce the pressure in said chamber sufficiently below the opposing brake pipe pressure in chamber 59 that a differential in said opposing pressures will be obtained on piston 57 which will move said piston and thereby piston 56 against spring 77 to the position defined by contact between the piston rib 70 and gasket 71. This operation of each brake application valve devices 43, 43a will close communication between the brake pipe and the respective chamber 59 and open said brake pipe to atmosphere past the open valve 62 therein to effect a further reduction in brake pipe pressure. The closing of communication between brake pipe and chamber 59 in the brake application valve device 43 at the control end of the vehicle cuts off further supply of fluid under pressure to the brake pipe from pipe 42 which is being supplied with fluid under pressure from the brake valve device 10, which is still in release position, whereby with the brake pipe 2 vented to effect an emergency application of brakes fluid under pressure cannot be supplied to the brake pipe to release such an application after automatic closing of the trip valve device 110. At the non-control end of the vehicle the operation of the brake application valve device 43a as above described will hasten the venting of fluid under pressure from the brake pipe but has no control over supply of fluid under pressure to the brake pipe since the brake valve device 10a at that end of the vehicle is in handle off position.

The operation of each brake application valve device 43, 43a in response to emergency operation of the trip valve device 110 will also unseat the respective lock valve 74 thereby opening the respective chamber 60 to passage 82 in the connected brake valve device 10, 10a. The control brake valve device 10 being in release position opens passage 82 through passage 83 in the rotary valve 24 to passage 50 and thereby atmosphere. At the non-control brake valve device 110a the lock valve 74 is also opened for connecting the respective chamber 60 to passage 82 in said brake valve device but said passage is not open to atmosphere as at the controlling brake valve device 10 due to plug 85 in the respective rotary valve passage 84.

When the reservoirs 102 are opened to the respective relay valve devices 54 to effect operation thereof to vent fluid under pressure from chambers 60 in the respective brake application valve devices 43, 43a, the pressure in said reservoirs will be gradually dissipated to atmosphere through the chokes 103a in the connecting pipes 103 and when such pressure thereby becomes reduced to a chosen low degree, the spring 101 in each relay valve device will return the diaphragm 99 to its normal position, in which it is shown in the drawing, for thereby opening the respective valve 93 and permitting closing of valve 86 by spring 91 whereby the respective pipe 80 is disconnected from atmosphere. At the control brake valve device 10 this has no effect however since the chamber 60 in the brake application valve device 43 is maintained open to atmosphere at this time past the open lock valve 74 and through passage 83 in the rotary valve of said brake valve device which is still in release position thereby ensuring that the parts of the brake application valve device 43 will be held in their brake pipe venting position preventing supply of fluid under pressure from chamber 59 to the brake pipe as long as the brake valve device 10 remains in release position supplying fluid under pressure to chamber 59. At the non-control end of the vehicle however the operation of the relay valve device 54a, to close communication between the connected pipe 80 and atmosphere and the plug 85 in the rotary valve 24 closing communication between pipe 81 and atmosphere, permits restoration of fluid pressure in chamber 60 by the restricted supply through choke 61 in the brake application valve device and when such pressure becomes increased sufficiently spring 77 therein will return the associated parts to their normal position closing the respective valve 66 and reopening the brake pipe 2 to chamber 59 therein. This is without effect however since the brake pipe remains open to atmosphere through the brake application valve device 43 at the control end of the vehicle while at the non-control end of the vehicle the brake valve device 10a being in handle off position prevents supply of fluid under pressure to chamber 59 in the brake application valve device 43a and thence to the brake pipe.

The volume of reservoir 102 and size of choke 103a at each end of the vehicle are so related that the respective relay valve device 54, 54a will remain in the position opening the connected pipe 80 to atmosphere, as above described, only long enough to ensure positive operation of the respective brake application valve device 43, 43a to its brake pipe venting position. The opening of the lock valve 74 in the brake application valve device 43 at the control end of the vehicle will then ensure that said valve device will remain in its brake pipe venting position as long as the brake valve 10 remains in its release position. After the opening of the lock valve 74 the respective relay valve device 54 may therefore promptly return to normal position for closing valve 86 in order that, whenever desired thereafter, the brakes may be released by return of the control brake valve device 10 to its release position, as will be presently described.

In effecting an emergency application of brakes by operation of the trip valve device 110 it is neither necessary nor detrimental in any way that the pilot valve device 53a, relay valve device 54a and brake application valve device 43a at the non-control end of the vehicle operate as above described since the intended result will be obtained by the sole operation of the coresponding device at the control end of the vehicle.

With the brake pipe 2 vented due to operation of the trip valve device 110 and the brakes on the vehicle applied as a result, and with the controlling brake valve device 10 still in release position it will be noted that there will be a continuous undesired leak of fluid under pressure from the brake system to atmosphere through choke 61 and past the open lock valve 74 in the brake application valve device 43 and thence through said brake valve device.

In order to stop such loss of fluid under pressure, the handle 26 of the controlling brake valve device 10 will be moved to lap position to close communication to passage 82 and to also cut off the supply of fluid under pressure to passage 41 and chamber 59 in the brake application valve device 43. With passage 82 in the brake valve device 10 thus lapped, the supply of fluid under pressure through choke 61 to chamber 60 in the brake application valve device 43 will build up the pressure therein eventually to that present in the feed valve pipe 11, but when sufficiently increased spring 77 will return the parts of said brake application valve device to their normal position for closing the brake pipe vent valve 62, opening communication between the connected pipe 42 and the brake pipe 2 and permitting closure of the lock valve 74, but with the brake valve device in lap position there will be no supply of fluid under pressure to said pipe 42 and the brake pipe 2. At the non-control end of the vehicle the parts of the brake application valve device 43a assumed their normal position immediately following the trip valve emergency application of brakes, as before mentioned.

Whenever the operator desires to release the application of brakes effected by operation of the trip valve device 110, he will turn handle 26 of the controlling brake valve device from lap position to its release position in which fluid under pressure will again be supplied to the connected pipe 42 from which it will flow through the brake application valve device 43 to the brake pipe for recharging same and thereby effecting operation of the brake controlling valve device 9 to release the vehicle brakes. The fluid under pressure thus supplied to the brake pipe at the control end of the vehicle will flow to the non-control end and through ports 68 to chamber 59 in the brake application valve device 43a but will have no effect thereon since the opposite side of the respective piston 57 is already subject in chamber 60 to fluid pressure from the feed valve pipe 11.

As the brake pipe 2 is recharged with fluid under pressure as just mentioned, such fluid will become present in diaphragm chamber 100 of the two pilot valve devices 53, 53a and when the pressure thereof is increased to a degree sufficient to overcome the opposing pressure of spring 101 on diaphragm 99, said diaphragm will be deflected to close valve 93 and open valve 86. This opening of valve 86 in each pilot valve device 53, 53a will reconnect the respective reservoir 102 to the feed valve pipe 11 whereby said reservoir will become charged with fluid under pressure for operating the respective relay valve device 54 or 54a upon a subsequent reduction in pressure in the brake pipe effected by the trip valve device 110.

Since the brake valve devices 10, 10a and other parts of the brake equipment at the two ends of the vehicle are identical, the operation of the equipment in response to operation of the trip valve device 110a when the control end of the vehicle is at brake valve device 10a will be substantially the same as above described when the brake valve device 10 was the control brake valve device, as it is believed will be evident.

*Summary*

From the above description it will now be seen that by the addition of the brake application valve devices 43, 43a, the pilot valve devices 53, 53a and relay valve devices 54, 54a to the "AMUE" brake equipment, the automatic closing trip valve devices 110, 110a may be used in connection with said equipment since the supply of fluid under pressure to the brake pipe will be cut off by said brake application valve devices, in case of an emergency reduction in brake pipe pressure being initiated by one of said trip valve devices, to ensure that the brakes will apply and not be undesirably released as would otherwise occur. With these additions to the "AMUE" brake equipment the plug 85 is necessary in the rotary valve of the brake valve devices in order to prevent dissipation of fluid under pressure, supplied to the brake pipe by the brake valve device at the control end of the vehicle, through the brake application valve device and brake valve device at the non-control end, whereby the release of a brake application may positively occur. Moreover, the pilot valve devices 54, 54a operating to close the vent from chamber 60 in the respective brake application valve device immediately after an emergency application of brakes is effected by operation of a trip valve device 110 or 110a permits the release of such application of brakes by movement of the brake valve handle 26 from lap position directly to release position.

Having now described my invention, what I claim as new and desire to secure by Letters Patent, is:

1. In a fluid pressure brake equipment, in combination, a brake pipe, an operator's brake valve device having one position for supplying fluid under pressure to said brake pipe and a second position for cutting off supply of fluid under pressure to said brake pipe, automatic closing trip valve means for effecting a reduction in pressure in said brake pipe, brake control means controlling communication through which fluid under pressure is supplied to said brake pipe by said brake valve device, means responsive to a reduction in pressure in said brake pipe effected by said trip valve means to effect operation of said brake control means to close said communication, means operative by said brake control means in its communication closing position and cooperative with said brake valve device in its said one position to hold said brake control means in its said communication closing position, and means for effecting movement of said brake control means to open said communication upon movement of said brake valve device to its said second position.

2. In a fluid pressure brake equipment, in combination, a brake pipe, an operator's brake valve device having one position for supplying fluid under pressure to said brake pipe and a second position for cutting off supply of fluid under pressure to said brake pipe, automatic closing trip valve means for effecting a reduction in pressure in said brake pipe, brake control means controlling one communication through which fluid under pressure is adapted to be supplied to said brake pipe and a second communication between said brake pipe and atmosphere, means responsive to a reduction in pressure in said brake pipe effected by said trip valve means to effect operation of said brake control means to one position to close said one communication and open said second communication, means operative by said brake control means in its said one position and cooperative with said brake valve device in its said one position to hold said brake control means in its said one position, and means operative upon movement of said brake valve device to its said second position to effect movement of said brake control means to a second position to open said one communication and close said second communication.

3. In a fluid pressure brake equipment, in combination, a brake pipe, an operator's brake valve device having a brake pipe charging position for supplying fluid under pressure to said brake pipe, and a second position for cutting off supply of fluid under pressure to said brake pipe, brake control means controlling communication through which fluid under pressure is supplied from said brake valve device to said brake pipe and operative in response to venting of fluid under pressure from a chamber to one position to close said communication, means operative upon charging said chamber with fluid under pressure to operate said brake control means to a second position to open said communication, means for supplying fluid under pressure to said chamber in said second position of said brake valve device, automatic closing trip means for opening a venting communication from said brake pipe, valve means operative upon a reduction in brake pipe pressure effected by operation of said trip means to establish a fluid pressure vent from said chamber, means for effecting operation of said valve means to close said vent a chosen interval of time after opening of said vent, means operative by said brake control means in said one position to open another communication to said chamber and in its second position to close such communication, said brake valve device comprising means operative in its charging position to open the last named communication to atmosphere and in its second position to close the named communication.

4. In a fluid pressure brake equipment, in combination, a brake pipe, an operator's brake valve device having a brake pipe charging position for supplying fluid under pressure to said brake pipe, and a second position for cutting off supply of fluid under pressure to said brake pipe, brake control means controlling communication through which fluid under pressure is supplied from said brake valve device to said brake pipe and operative in response to venting of fluid under pressure from a chamber to one position to close said communication, means operative upon charging said chamber with fluid under pressure to operate said brake control means to a second position to open said communication, means for supplying fluid under pressure to said chamber in said second position of said brake valve device, automatic closing trip means for opening a venting communication from said brake pipe, relay valve means operative by fluid under pressure to establish a vent from said chamber and upon release of such fluid under pressure to close said vent, a reservoir, pilot valve means operative by pressure of fluid in said brake pipe to charge said reservoir with fluid under pressure and operative upon a reduction in pressure in said brake pipe to open said reservoir to said relay valve means to effect operation thereof, means for venting the fluid under pressure supplied to operate said relay means to permit operation thereof to close said vent, a valve operable by said brake control means in its said one position to open another communication from said chamber, means for closing said valve in said second position of said brake control means, said brake valve device comprising means for opening the last named communication to atmosphere in its said charging position and for closing said last named communication in its second position, and means providing a constant restricted supply of fluid under pressure to said chamber.

5. In a fluid pressure brake equipment, in combination, a brake pipe, an operator's brake valve device having a brake pipe charging position for supplying fluid under pressure to said brake pipe and also having a lap position and a handle off position for preventing supply of fluid under pressure to said brake pipe, brake control means controlling communication through which fluid under pressure is supplied from said brake valve device to said brake pipe and operative in response to venting of fluid under pressure from a chamber to a position for closing said communication, means operative upon charging said chamber with fluid under pressure to operate said brake control means to a second position to open said communication, automatic closing trip valve means for effecting a reduction in pressure in said brake pipe, valve means responsive to a reduction in pressure in said brake pipe effected by said trip valve means to open a fluid pressure vent from said chamber and including means for closing said vent a chosen interval of time after opening thereof, a pipe, a lock valve operable by said brake control means in said one position thereof to open said chamber to said pipe, means for operating said lock valve to close communication between said chamber and pipe in said second position of said brake control means, said brake valve device comprising passageways for opening said pipe to atmosphere in said charging and handle off positions and for closing said pipe off from atmosphere in said lap position, and means closing communication through the one of said passageways effective in said handle off position.

ERIK G. ERSON.

REFERENCES CITED

The following references are of record in the file of this patent:

UNITED STATES PATENTS

| Number | Name | Date |
| --- | --- | --- |
| 2,081,465 | Stewart | May 25, 1937 |
| 2,299,476 | Farmer | Oct. 20, 1947 |